United States Patent [19]
Rogard

[11] Patent Number: 4,718,066
[45] Date of Patent: Jan. 5, 1988

[54] SELF-ADAPTIVE HYBRID DATA TRANSMISSION

[75] Inventor: Roger Rogard, Lisse, Netherlands

[73] Assignee: Agence Spataile Europeenne, France

[21] Appl. No.: 831,497

[22] Filed: Feb. 21, 1986

[30] Foreign Application Priority Data

Mar. 5, 1985 [FR] France ................................. 85 03215

[51] Int. Cl.$^4$ ............................................. G06F 11/10
[52] U.S. Cl. ......................................................... 371/35
[58] Field of Search ........................ 371/32, 35, 40, 41

[56] References Cited

U.S. PATENT DOCUMENTS

| | | | |
|---|---|---|---|
| 3,413,600 | 11/1968 | Ohnsorge | 371/35 |
| 3,646,518 | 2/1972 | Weinstein | 371/35 |
| 4,344,171 | 8/1982 | Lin | 371/35 |

FOREIGN PATENT DOCUMENTS

| | | | |
|---|---|---|---|
| 252972 | 12/1985 | Japan | 371/35 |
| 151371 | 10/1981 | Netherlands | 371/35 |

OTHER PUBLICATIONS

S. Lin, "Hybrid Selective-Repeat ARQ with Finite Buffer", vol. 24, No. 6, 11/1981, pp. 2883-2885.
U. Haller et al., "A Forward Error Correction System for Heavily Disturbed Data Transmission Channels", 1972, pp. 523-530.

Primary Examiner—Jerry Smith
Assistant Examiner—Robert W. Beausoliel, Jr.
Attorney, Agent, or Firm—Parkhurst & Oliff

[57] ABSTRACT

The invention relates to data transmission, especially between a satellite and land-mobile terminals, which is self-adaptive and hybrid, i.e. a system which encodes data in sets of blocks including redundant symbols and redundant blocks, and provides automatic retransmission of lost data blocks and in parallel, correction of detected errors within received blocks.

In the embodiment described, the data is encoded in a Reed-Solomon code in a two-dimensional mode. Each set of data is transmitted automatically and continuously; the receiver registers the data received and corrects detected errors in the relevant block up to a threshold number; if the number of detected errors in the block exceeds the threshold, the block is erased. When sufficient data has been received to decode the complete set of blocks, the receiver transmits a reception acknowledgement signal repeatedly. When the transmitter receives the reception acknowledgement signal, it interrupts transmission of the current set and starts transmitting the next set, on reception of which the receiver halts transmission of the reception acknowledgement signal.

5 Claims, 4 Drawing Figures

SELF-ADAPTIVE HYBRID DATA TRANSMISSION

BACKGROUND OF THE INVENTION

This invention relates to a telecommunication system, particularly, but not exclusively, applicable to links between a satellite and land-mobile terminals. More particularly, the invention relates to a method of and apparatus for data transmission which enable detection and correction of errors introduced during transmission and utilize a new ARQ principle (Automatic Retransmission on request).

The essential objective of a data transmission method of this kind is to transform and encode a data message into another message less vulnerable to transmission errors and equivalent to the initial message. It is known to attain this objective by using a redundant code which enables the initial message to be reconstituted from reception of a coded message which is incomplete or includes errors.

In the case of a satellite to-earth station link, for which the invention is particularly suitable, the transmission of data is frequently affected by periods of fading or even complete interruption of communication (black-out). FIGS. 3 and 4 of the accompanying drawings, which represent the received signal displayed on the cathode screen of a spectrum analyzer, show typical examples of such disturbances: the signal of FIG. 3 corresponds to periodic fading such as may be produced by regularly spaced trees along a road along which a receiver vehicle is driving; FIG. 4 corresponds to temporary fading caused by passing under a bridge which crosses a motorway.

However, most of the time, reception is good, for example when the vehicle is on a main road in the country-side. In this case, the link is identical to a white noise Gaussian channel.

The invention aims to provide a data transmission system for use between satellites and mobile terminals for example, which has high transmission throughput, while limiting the risk of producing procedural ambiguities during poor propagation conditions.

Various transmission systems known to solve certain problems due to poor propagation conditions are of the hybryd ARQ type; that is to say, they are based on automatic retransmission on request when data has been lost. The name of these systems derives from the RQ symbol, for retransmission request, in the telegraph system patented in 1943. The transmission system is called hybrid when it also uses in parallel an error correction process.

DESCRIPTION OF THE PRIOR ART

Different transmission procedures are known in ARQ systems:

Stop and Wait is the simplest of these procedures. The data blocks are transmitted one after the other; after transmission of one block, the transmitter no longer transmits until the arrival of a reception acknowledgement from the receiver terminal. If the acknowledgement is positive (ACK), the following data block is transmitted and a copy stored in a buffer memory. If the acknowledgement is negative (NACK), the same block is retransmitted from the buffer memory.

Go-back-N: the transmitter transmits data blocks continuously until the moment when a negative acknowledgement is received from the receiver. The transmitter repeats the transmission of the last N blocks.

Selective repeat ARQ: the transmitter transmits continuously and the receiver requests the retransmission only of the wrongly received blocks.

These procedures can be combined with error correction techniques.

The evaluation criteria for the performance of each of the ARQ systems mentioned above are mainly the throughput of the system, defined as the ratio between the number of pure information data symbols of the message received and the total number of symbols actually transmitted (including the sum of data symbols and check symbols), and the duration of occupation of the transmission channel. This latter parameter is particularly important in the case of satellite telecommunications.

None of the known systems is really optimal in the light of these two criteria.

Moreover, known systems require the existence of a good quality of the return channel for transmission of the reception acknowledgement signals and the retransmission request signals sent by the receiver. In fact, in the case where the forward channel is bad, that is to say when an ARQ system is truly useful, it happens that the return channel is usually bad as well and therefore the risk of losing a "reception acknowledgement" message is high.

As for the known encoding techniques used for the transmission of data disturbed by prolonged periods of fading which produce bursts error, they usually include interleaving techniques. These techniques enable the reduction or elimination of the correlation between the errors which affect the successive symbols applied to a decoder, particularly by transmitting the different components of a block in an order different from that which the decoder will receive. These interleaving techniques have the disadvantage of increasing further the transmission time.

OBJECTS OF THE INVENTION

An object of the present invention is to provide a remedy for disadvantages of the prior art, as mentioned above, and more particularly for disadvantages which would appear during use of prior systems for satellite telecommunication.

A specific object of the present invention is to improve throughput in a transmission system compared to the best of the known procedures referred to, the selective ARQ system, which suffers from long transmission times, especially when retransmission is necessary.

Another object of the invention is to obtain a flexible and adaptive transmission process, enabling a reduction in both the procedure and effort of encoding when the transmission channel is good.

Yet another object of the invention is to limit the information to be transmitted over the return channel and to simplify the scheduling in time of the procedures.

A supplementary object of the invention is to reduce the transmission delay, which is rather long in the case of known procedures, especially in procedures using interleaving.

Another object of the invention is to limit the ambiguity of the protocols when the return channel is also bad.

BRIEF DESCRIPTION OF THE INVENTION

One aspect of the present invention provides a method of self-adaptive, hybrid data transmission comprising encoding a message in sets of data blocks, each block including additional check symbols enabling error detection and correction within the block and said sets including redundant data blocks, transmitting a set of said data blocks continuously from a transmitter to a receiver, using for each block said check symbols to correct any detected errors, erasing, the blocks whose errors exceed the correction enabled by using said check symbols, transmitting a return signal from said receiver when a sufficient number of blocks has been registered to enable the current set of blocks to be decoded, interrupting transmission of said current set of blocks in response to reception of said return signal at said transmitter and transmitting the next set of data blocks.

Another aspect of the invention provides a transmitter apparatus for use in self-adaptive, hybrid data transmission comprising encoding means for encoding a message in sets of data blocks, each block including additional check symbols enabling detection and correction within the block and said sets including redundant data blocks, transmitting means for transmitting a set of said data blocks continuously to a remote receiver station, said transmitter apparatus including receiver means responsive to a return signal from said receiver apparatus indicating that a sufficient number of blocks has been correctly received, after correction if necessary, for decoding of the current set data to interrupt transmission of said current set of data blocks and cause said transmitting means to transmit the next set of data block.

Preferably, said encoder means is operative according to a Reed-Solomon code in a two-dimensional mode enabling detection and correction of errors within a received data block in the first (vertical) dimension, and transmission of otherwise redundant blocks within each said current set until reception of said return signal for further enabling detection and correction of errors in a second (horizontal) dimension.

In a preferred embodiment of the invention, said receiver means is responsive to a simple reception acknowledgement signal from said receiver apparatus.

Yet another aspect of the invention provides a receiver apparatus for use in self-adaptive, hybrid data transmission comprising receiver means for receiving signals from a transmitter apparatus, said signals having been encoded in sets of data blocks, each block including additional check symbols enabling error detection and correction within the block and said sets including redundant data blocks, decoding means responsive to the check symbols in the received signals to correct any detected errors in each received block, to register correctly received and corrected blocks and to erase blocks whose detected errors exceed the correction enabled by using said check symbols, and acknowledgement means for transmitting a return acknowledgement signal to said transmitter apparatus when a sufficient number of blocks has been registered by said decoding means to enable the current set of blocks to be decoded, whereby to interrupt transmission of said current set of blocks and enable transmission of the next set of data blocks.

Preferentially, said acknowledgement means of said receiver apparatus is responsive to reception of the next set of data to interrupt transmission of said acknowledgement signal.

DESCRIPTION OF THE DRAWINGS

Other features and advantages of the invention will appear from the following description, given by way of example with reference to the accompanying drawings, in which.

Tables I to VI show examples of the results of simulated data transmissions.

DESCRIPTION OF THE PREFERRED EMBODIMENTS OF THE INVENTION

The data transmission process of this embodiment of the invention is based on a self-adaptive ARQ procedure which will be named STARQ, since the only acknowledgement of reception signal transmitted by the receiver is "STOP TRANSMIT" (or "ST") which means that sufficient data has been received for decoding of the message to be possible and that the transmitter may now transmit the next set of data.

As indicated above, this embodiment of the invention is based on preferential use of encoding techniques of the Reed-Solomon type, in a two-dimensional mode. In order to explain the complete transmission process, the characteristics of Reed-Solomon codes will first be noted, then the two-dimensional code scheme explained and, finally, the functioning of a transmission in accordance with this embodiment of the invention will be illustrated.

Reed-Solomon codes are B.C.H. codes (Bose-Chaudhuri-Hocquenghem), that is to say linear cyclic codes in blocks, the Reed-Solomon codes having the feature of being non-binary, i.e. comprising symbols belonging to an alphabet of q members, q being a whole number or a power of a whole number.

The fundamental characteristics of Reed-Solomon codes are as follows:

the data blocks have a length of N symbols, each symbol being an element of a Galois field F (q).

In the preferred embodiment described the following values are chosen:

$q = 2^n$ $n = 4$

N is not arbitrary:

$N = q - 1 = 2^n - 1 = 15$ symbols

It is possible to extend the length of the code by one or two symbols. For our application, it is useful to take an even number for N (N=16), which corresponds to a whole number of bytes. The extension of Reed-Solomon codes with N=16 will be retained for the examples given below.

The number of data symbols present in each data block is equal to K which may be any number less than N to satisfy the redundancy condition. The supplementary symbols are check symbols, calculated by linear combinations as a function of the data symbols.

The error detection capacity is a number less than or equal to $(N-K)/2$ errors, whatever their distribution.

The erasure correction capacity is identical to the error detection capacity.

An erasure is a symbol identified as being incorrect or declared incorrect a priori. Arbitrarily, reception of a "zero" symbol is assumed.

By way of example, a coded block characterized by the couple $(N,K)=(16,12)$ enables:
  detection of up to 4 errors
  correction of up to 2 errors
  correction of up to 4 erasures.

For a couple $(N,K)=(16,8)$, correction of up to 8 erasures is achieved.

An example of two-dimensional encoding is the CRC technique (cyclic redundancy check) used for checking data from a magnetic tape. This technique has been adapted to Reed-Solomon encoding and an example of this new use is illustrated in FIG. 1.

Figure 1:
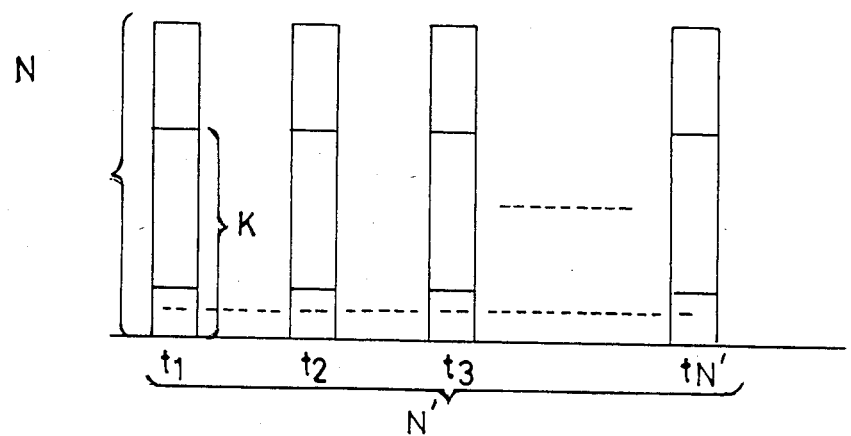
FIG. 1 is a schematic diagram showing the structure of a set of data blocks such as is transmitted by means of a method in accordance with an embodiment of the invention.

In FIG. 1, N' data blocks containing N symbols are represented by vertical columns, each block having been received at a time $t_{N'}$. The data contained in each block consists of K symbols and the number of useful blocks is K'. The total number of useful data symbols is therefore $K \times K'$.

The data contained in each block has been encoded using Reed-Solomon encoding for the correction of random errors.

Another Reed-Solomon encoding has been used in the horizontal direction for the correction of burst errors using the erasure correction capacity of this code.

If the block transmission time is short relative to the fading band-width, fading will correspond to the erasure of a complete block. It is therefore necessary to have instantaneous information concerning the transmission channel state to detect this type of situation in which the inherent error detection capacity of the code is exceeded.

There are thus two cases of block erasure corresponding either to a poor state of the channel, or to good channel state but impossibility of error correction.

If these two cases are used as a base, the full advantages of two-dimensional encoding will not be obtained. However, the horizontal decoding will be simplified.

This scheme, while being a two-dimensional code, may be considered as T an interleaving scheme for the horizontal code and, consequently, capable of coping with error bursts.

The adaptation of this scheme to the STARQ procedure of the invention will now be considered.

In an ordinary ARQ system, retransmission is requested when block erasure is detected. The propagation time, especially in the case of a satellite telecommunication system necessitates either numbering of the blocks or a restriction in the first parameters. Moreover, the quality of the return channel is no better than that of the foward channel and it is necessary to be careful in using the reception acknowledgement procedure, or even avoid it as far as possible, and to use it in a safe manner.

The basic principle of the scheme in this embodiment of the invention is as follows:
  in the vertical direction, there is no change from the two-dimensional scheme.
  in the horizontal direction (time axis), a code rate of ½ (or even less) is selected, for example in the case referred to above a code (16,8), which means that a set of 8 data blocks are transmitted plus redundant supplementary blocks as desired. Decoding in this direction considers that a block (vertical code) is either correct (after applying the correction algorithm) or erased. Using the selected code, it is possible to decode a code vector which has up to 8 erasures or, in other words, after successful reception of 8 blocks there will be sufficient information for decoding. Thus it is possible to send an acknowledgement for this set of data blocks, to halt transmission of any information which is available, and to continue with the next set.

Figure 2:
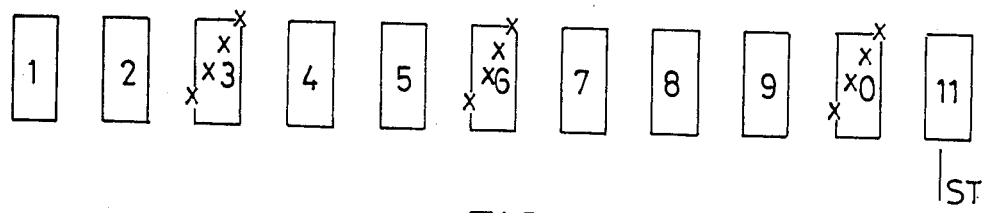
FIG. 2 is a schematic diagram showing the transmission sequence of a set of data blocks in this method.
Figure 3:
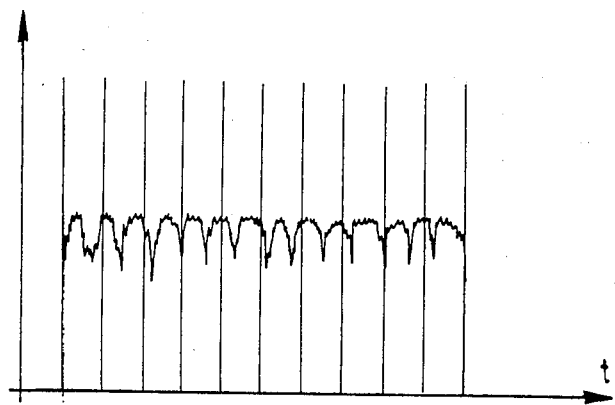
FIGS. 3 and 4 are diagrams showing oscillagrams representing typical transmission disturbances when the receiving station is mounted in a moving automobile vehicle.
Figure 4:
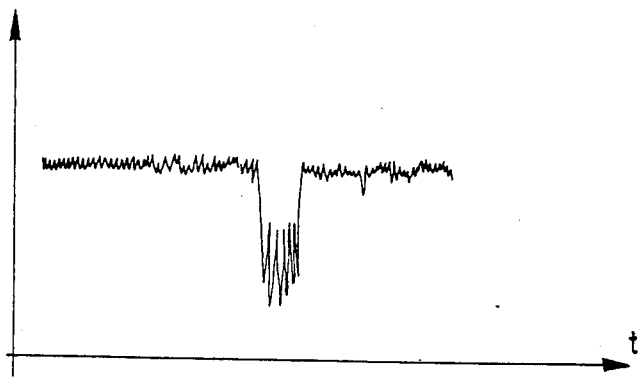

An example of the process is illustrated in FIG. 2, which shows a sequence of received data, numbered 1 to 11, and of which blocks 3, 6 and 10 have not been received correctly. Following reception of the first 8 blocks, 2 have been declared erased: blocks 3 and 6. The reception acknowledgement has been sent only after the, reception of 3 supplementary blocks, one of which (No. 10) has been declared erased, which gives a total of 8 blocks received correctly.

In an ordinary system, it would have been necessary to request repetition of blocks 3 and 6, for example, using the return channel which is no better than the forward channel, that is to say with no guarantee of success. In the scheme proposed by the invention, the reception acknowledgement will be repeated several times, without ambiguity and, as soon as this acknowledgement is received by the transmitter, the transmitter will continue by transmitting another set of data. The only risk is that the transmitter will send one or two data blocks more than was necessary.

In this example, it can also be seen how the scheme uses interleaving advantageously without introducing further transmission delays.

Simulation of the operation of the self-adaptive hybrid data transmission process of this embodiment of the invention has been developed on a HP 9816 apparatus. The results of this simulation are shown successively in Tables I to VI.

Table I shows the 96 data symbols of the set of data to be transmitted, these data symbols being arranged in eight successive blocks of 12 symbols each.

Table II shows the set of data after it has been subjected to the operation of two-dimensional encoding. This encoding is performed firstly by completing each of the eight original blocks with 4 symbols each, aligned vertically follows the 12 data symbols. This vertical coding thus has a couple $(N,K)=(16,12)$ which allows up to 4 errors to be detected and up to two to be corrected, as mentioned above.

The second part of the encoding consists in building eight check blocks, aligned horizontally with the eight data blocks which have undergone vertical encoding. This "horizontal" encoding is characterized by a couple $(N,K)=(16,8)$ and enables correction of up to eight block erasures.

Table III shows the table of errors, as chosen to test the different correction capacities of the data transmission process in this embodiment of the invention. It will be noted that the first block will incur two errors and that the second and third data blocks will each have four errors.

Table IV shows the set of data such as it will be received, without having undergone any decoding operation. However, the STARQ procedure's self-adaptation feature will enable just the number of blocks strictly necessary to recover the initial message to be transmitted from this complete set of encoded data.

Consequently, as shown in V, the "vertical" Table decoding will reveal firstly that block 1 is not erased since two errors have been detected in it (see the table of errors in Table III), which remains within the correction capacity of the vertical encoding characterized by the couple (N,K)=(16,12). On the other hand, blocks 2 and 3 have incurred four errors each, which have indeed been detected but cannot be corrected since the number exceeds the correction capacity of the vertical encoding. Blocks 2 and 3 are therefore considered as erased. Consequently it is necessary to receive two supplementary check blocks, in addition to the original eight data blocks, to compensate the erasure of blocks 2 and 3. Since none of blocks 4 to 10 is erased, the receiver can transmit a reception acknowledgement signal which interrupts the transmission of the set of data, after reception of the tenth block.

Thus, it has not been necessary, in this case, to transmit all the check blocks. It is clear that the procedure thus offers a gain in transmission time which is particularly worthwhile in the case of a satellite link.

Table VI shows, lastly, the set of strict information data such as it is restituted after the final "horizontal" decoding operation. This decoding has enabled the value of each of the data symbols of blocks 2 and 3 to be found out of the eight non-erased blocks received, by applying the Reed-Solomon error correction algorithm used.

The basic algorith, which is practically identical for the vertical and horizontal dimensions, is capable of decoding up to 500 bits/sec in real time. The optimisation of the algorithm using FFT (Fast Fourier Transform ) techniques can further accelerate the treatment by a factor of two or three and using a higher performance simulation language than the PASCAL language will give a gain of at least a factor of 4. It follows that the actual embodiment of the invention will require no special equipment for data transmission with a data rate up to about 2.4K bits/sec.

Preferably, the "horizontal" code rate enabling the encoding and decoding of redundant check blocks for correction of block erasures in each transmitted set is at most ½ so as to provide, in a limit case, erasure of the eight original data blocks during a very poor transmission.

The procedure for interrupting the transmitted set when a sufficient number of non-erased blocks has been received to enable the decoding of the transmitted message is obtained by the transmission of a single reception acknowledgement signal from the receiver station. Advantageously, the reception acknowledgement signal is repeated several times, until the transmission of data is actually interrupted.

This embodiment of the invention is particularly suitable for use in a data transmission system in the framework of the PROSAT program, for maritime, aeronautical or land-mobile terminals.

TABLE I

| MESSAGE TO BE TRANSMITTED | | | | | | | |
|---|---|---|---|---|---|---|---|
| 1 | 2 | 3 | 4 | 5 | 6 | 7 | 8 |
| 2 | 2 | 2 | 2 | 2 | 2 | 2 | 2 |
| 3 | 3 | 3 | 3 | 3 | 3 | 3 | 3 |
| 4 | 4 | 4 | 4 | 4 | 4 | 4 | 4 |
| 5 | 5 | 5 | 5 | 5 | 5 | 5 | 5 |
| 6 | 6 | 6 | 6 | 6 | 6 | 6 | 6 |
| 7 | 7 | 7 | 7 | 7 | 7 | 7 | 7 |
| 8 | 8 | 8 | 8 | 8 | 8 | 8 | 8 |
| 9 | 9 | 9 | 9 | 9 | 9 | 9 | 9 |
| 1 | 1 | 1 | 1 | 1 | 1 | 1 | 1 |
| 2 | 2 | 2 | 2 | 2 | 2 | 2 | 2 |
| 3 | 3 | 3 | 3 | 3 | 3 | 3 | 3 |

TABLE II

| MESSAGE AFTER TWO-DIMENSIONAL ENCODING | | | | | | | | | | | | | | | |
|---|---|---|---|---|---|---|---|---|---|---|---|---|---|---|---|
| 1 | 2 | 3 | 4 | 5 | 6 | 7 | 8 | 14 | 5 | 3 | 15 | 2 | 15 | 4 | 6 |
| 2 | 2 | 2 | 2 | 2 | 2 | 2 | 2 | 2 | 2 | 2 | 2 | 2 | 2 | 2 | 0 |
| 3 | 3 | 3 | 3 | 3 | 3 | 3 | 3 | 3 | 3 | 3 | 3 | 3 | 3 | 3 | 0 |
| 4 | 4 | 4 | 4 | 4 | 4 | 4 | 4 | 4 | 4 | 4 | 4 | 4 | 4 | 4 | 0 |
| 5 | 5 | 5 | 5 | 5 | 5 | 5 | 5 | 5 | 5 | 5 | 5 | 5 | 5 | 5 | 0 |
| 6 | 6 | 6 | 6 | 6 | 6 | 6 | 6 | 6 | 6 | 6 | 6 | 6 | 6 | 6 | 0 |
| 7 | 7 | 7 | 7 | 7 | 7 | 7 | 7 | 7 | 7 | 7 | 7 | 7 | 7 | 7 | 0 |
| 8 | 8 | 8 | 8 | 8 | 8 | 8 | 8 | 8 | 8 | 8 | 8 | 8 | 8 | 8 | 0 |
| 9 | 9 | 9 | 9 | 9 | 9 | 9 | 9 | 9 | 9 | 9 | 9 | 9 | 9 | 9 | 0 |
| 1 | 1 | 1 | 1 | 1 | 1 | 1 | 1 | 1 | 1 | 1 | 1 | 1 | 1 | 1 | 0 |
| 2 | 2 | 2 | 2 | 2 | 2 | 2 | 2 | 2 | 2 | 2 | 2 | 2 | 2 | 2 | 0 |
| 3 | 3 | 3 | 3 | 3 | 3 | 3 | 3 | 3 | 3 | 3 | 3 | 3 | 3 | 3 | 0 |
| 13 | 2 | 8 | 10 | 4 | 7 | 3 | 11 | 12 | 4 | 8 | 0 | 2 | 0 | 10 | 15 |
| 10 | 0 | 11 | 15 | 6 | 8 | 2 | 5 | 3 | 6 | 11 | 13 | 0 | 13 | 15 | 11 |
| 1 | 13 | 0 | 14 | 3 | 9 | 11 | 5 | 7 | 3 | 0 | 6 | 13 | 6 | 14 | 13 |
| 4 | 6 | 15 | 3 | 14 | 7 | 12 | 10 | 9 | 14 | 15 | 13 | 6 | 13 | 3 | 13 |

TABLE III

| TABLE OF ERRORS | | | | | | | | | | | | | | | |
|---|---|---|---|---|---|---|---|---|---|---|---|---|---|---|---|
| 13 | 13 | 13 | 0 | 0 | 0 | 0 | 0 | 0 | 0 | 0 | 0 | 0 | 0 | 0 | 0 |
| 13 | 13 | 0 | 0 | 0 | 0 | 0 | 0 | 0 | 0 | 0 | 0 | 0 | 0 | 0 | 0 |
| 0 | 13 | 0 | 0 | 0 | 0 | 0 | 0 | 0 | 0 | 0 | 0 | 0 | 0 | 0 | 0 |
| 0 | 13 | 0 | 0 | 0 | 0 | 0 | 0 | 0 | 0 | 0 | 0 | 0 | 0 | 0 | 0 |
| 0 | 0 | 13 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 13 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 13 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

TABLE III-continued
TABLE OF ERRORS

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|

TABLE IV
TRANSMITTED MESSAGE BEFORE VERTICAL ENCODING

| 12 | 14 | 8  | 4  | 5  | 6  | 7  | 8  | 14 | 5  | 3  | 15 | 2  | 15 | 4  | 6  |
|----|----|----|----|----|----|----|----|----|----|----|----|----|----|----|----|
| 14 | 14 | 2  | 2  | 2  | 2  | 2  | 2  | 2  | 2  | 2  | 2  | 2  | 2  | 2  | 0  |
| 3  | 8  | 3  | 3  | 3  | 3  | 3  | 3  | 3  | 3  | 3  | 3  | 3  | 3  | 3  | 0  |
| 4  | 11 | 4  | 4  | 4  | 4  | 4  | 4  | 4  | 4  | 4  | 4  | 4  | 4  | 4  | 0  |
| 5  | 5  | 7  | 5  | 5  | 5  | 5  | 5  | 5  | 5  | 5  | 5  | 5  | 5  | 5  | 0  |
| 6  | 6  | 6  | 6  | 6  | 6  | 6  | 6  | 6  | 6  | 6  | 6  | 6  | 6  | 6  | 0  |
| 7  | 7  | 7  | 7  | 7  | 7  | 7  | 7  | 7  | 7  | 7  | 7  | 7  | 7  | 7  | 0  |
| 8  | 8  | 8  | 8  | 8  | 8  | 8  | 8  | 8  | 8  | 8  | 8  | 8  | 8  | 8  | 0  |
| 9  | 9  | 10 | 9  | 9  | 9  | 9  | 9  | 9  | 9  | 9  | 9  | 9  | 9  | 9  | 0  |
| 1  | 1  | 1  | 1  | 1  | 1  | 1  | 1  | 1  | 1  | 1  | 1  | 1  | 1  | 1  | 0  |
| 2  | 2  | 2  | 2  | 2  | 2  | 2  | 2  | 2  | 2  | 2  | 2  | 2  | 2  | 2  | 0  |
| 3  | 3  | 3  | 3  | 3  | 3  | 3  | 3  | 3  | 3  | 3  | 3  | 3  | 3  | 3  | 0  |
| 13 | 2  | 3  | 10 | 4  | 7  | 3  | 11 | 12 | 4  | 8  | 0  | 2  | 0  | 10 | 15 |
| 10 | 0  | 11 | 15 | 6  | 8  | 2  | 5  | 3  | 6  | 11 | 13 | 0  | 13 | 15 | 11 |
| 1  | 13 | 0  | 14 | 3  | 9  | 11 | 5  | 7  | 3  | 0  | 6  | 13 | 6  | 14 | 13 |
| 4  | 6  | 15 | 3  | 14 | 7  | 12 | 10 | 9  | 14 | 15 | 13 | 6  | 13 | 3  | 13 |

TABLE V
TRANSMITTED MESSAGE BEFORE HORIZONTAL DECODING

| 1  | 0  | 0  | 4  | 5  | 6  | 7  | 8  | 14 | 5  |
|----|----|----|----|----|----|----|----|----|----|
| 2  | 0  | 0  | 2  | 2  | 2  | 2  | 2  | 2  | 2  |
| 3  | 0  | 0  | 3  | 3  | 3  | 3  | 3  | 3  | 3  |
| 4  | 0  | 0  | 4  | 4  | 4  | 4  | 4  | 4  | 4  |
| 5  | 0  | 0  | 5  | 5  | 5  | 5  | 5  | 5  | 5  |
| 6  | 0  | 0  | 6  | 6  | 6  | 6  | 6  | 6  | 6  |
| 7  | 0  | 0  | 7  | 7  | 7  | 7  | 7  | 7  | 7  |
| 8  | 0  | 0  | 8  | 8  | 8  | 8  | 8  | 8  | 8  |
| 9  | 0  | 0  | 9  | 9  | 9  | 9  | 9  | 9  | 9  |
| 1  | 0  | 0  | 1  | 1  | 1  | 1  | 1  | 1  | 1  |
| 2  | 0  | 0  | 2  | 2  | 2  | 2  | 2  | 2  | 2  |
| 3  | 0  | 0  | 3  | 3  | 3  | 3  | 3  | 3  | 3  |
| 13 | 2  | 3  | 10 | 4  | 7  | 3  | 11 | 12 | 4  |
| 10 | 0  | 11 | 15 | 6  | 8  | 2  | 5  | 3  | 6  |
| 1  | 13 | 0  | 14 | 3  | 9  | 11 | 5  | 7  | 3  |
| 4  | 6  | 15 | 3  | 14 | 7  | 12 | 10 | 9  | 14 |

TABLE VI
FINAL DECODED MESSAGE

| 1 | 2 | 3 | 4 | 5 | 6 | 7 | 8 |
|---|---|---|---|---|---|---|---|
| 2 | 2 | 2 | 2 | 2 | 2 | 2 | 2 |
| 3 | 3 | 3 | 3 | 3 | 3 | 3 | 3 |
| 4 | 4 | 4 | 4 | 4 | 4 | 4 | 4 |
| 5 | 5 | 5 | 5 | 5 | 5 | 5 | 5 |
| 6 | 6 | 6 | 6 | 6 | 6 | 6 | 6 |
| 7 | 7 | 7 | 7 | 7 | 7 | 7 | 7 |
| 8 | 8 | 8 | 8 | 8 | 8 | 8 | 8 |
| 9 | 9 | 9 | 9 | 9 | 9 | 9 | 9 |
| 1 | 1 | 1 | 1 | 1 | 1 | 1 | 1 |
| 2 | 2 | 2 | 2 | 2 | 2 | 2 | 2 |
| 3 | 3 | 3 | 3 | 3 | 3 | 3 | 3 |

I claim:

1. A method of self-adaptive, hybrid data transmission comprising the steps of:
   (a) encoding a message into data blocks, each block including check symbols for error detection and correction;
   (b) grouping the data blocks in sets and encoding each set to include redundant blocks for error detection and correction;
   (c) sequentially and continuously transmitting a set of data blocks;
   (d) sequentially receiving said transmitted set of data blocks;
   (e) correcting detected errors in the received blocks;
   (f) erasing received blocks for which correction is impossible;
   (g) receiving a redundant block for each data block erased in the set;
   (h) transmitting a return signal when the number of redundant blocks equals the number of erased blocks;
   (i) interrupting sequential transmission of the set of blocks upon receiving the return signal; and
   (j) repeating steps (c)–(i).

2. A method of self-adaptive hybrid data transmission according to claim 1, wherein said return signal is transmitted until it is established that the transmission of said set of blocks is interrupted.

3. A method as claimed in claim 1, wherein said data is transmitted between a satellite and earth stations.

4. A method of self-adaptive, hybrid data transmission comprising the steps of:
   (a) encoding a message into data blocks, each block including check symbols for error detection and correction obtained through a first vertical Reed Solomon encoding mode;
   (b) grouping the data blocks in sets and encoding each set to include redundant data blocks obtained through a second horizontal Reed Solomon encoding mode;
   (c) sequentially and continuously transmitting a set of data blocks;
   (d) sequentially receiving said transmitted set of data blocks;
   (e) correcting detected errors in said received data blocks using respective check symbols;
   (f) erasing received data blocks for which correction using respective check symbols is impossible;
   (g) receiving a redundant data block for each data block erased in the set;
   (h) transmitting a return signal when the number of received redundant blocks equals the number of erased blocks;
   (i) interrupting sequential transmission of the set of blocks upon receipt of the return signal; and
   (j) repeating steps (c)–(i).

5. Method of self-adaptive, hybrid data transmission according to claim 4, wherein the code rate of said second horizontal Reed Solomon encoding mode is at most equal to ½.

* * * * *